US012379488B2

(12) United States Patent
Saito et al.

(10) Patent No.: US 12,379,488 B2
(45) Date of Patent: Aug. 5, 2025

(54) RADAR DEVICE, VEHICLE, AND METHOD OF ESTIMATING NUMBER OF INCOMING WAVES

(71) Applicant: Murata Manufacturing Co., Ltd., Nagaokakyo (JP)

(72) Inventors: Ryo Saito, Nagaokakyo (JP); Katsuhisa Kashiwagi, Nagaokakyo (JP); Nobuya Arakawa, Nagaokakyo (JP); Koichi Ichige, Kanagawa (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 547 days.

(21) Appl. No.: 17/963,220

(22) Filed: Oct. 11, 2022

(65) Prior Publication Data

US 2023/0030969 A1 Feb. 2, 2023

Related U.S. Application Data

(63) Continuation of application No. PCT/JP2021/014911, filed on Apr. 8, 2021.

(30) Foreign Application Priority Data

Apr. 17, 2020 (JP) .................................. 2020-074296

(51) Int. Cl.
*G01S 13/931* (2020.01)
*G01S 13/42* (2006.01)

(52) U.S. Cl.
CPC ............ *G01S 13/931* (2013.01); *G01S 13/42* (2013.01)

(58) Field of Classification Search
CPC ........ G01S 13/931; G01S 7/35; G01S 13/434; G01S 13/42
See application file for complete search history.

(56) References Cited

U.S. PATENT DOCUMENTS 7,755,537 B2 * 7/2010 Shimizu ................ G01S 7/4026
342/359
8,441,395 B2 * 5/2013 Kanamoto ............ G01S 13/426
342/149

(Continued)

FOREIGN PATENT DOCUMENTS

CN 105301591 A 2/2016
JP 2000-235072 A 8/2000

(Continued)

OTHER PUBLICATIONS

Japanese Office Action issued Jul. 20, 2023, in corresponding Japanese Patent Application No. 2022-515342, 6pp.

(Continued)

*Primary Examiner* — Peter M Bythrow
(74) *Attorney, Agent, or Firm* — XSENSUS LLP

(57) ABSTRACT

A radar device includes an oscillator that generates a transmission signal including a plurality of chirp signals, the chirp signal having a frequency that increases or decreases from an initial frequency in each predetermined sweep cycle. The oscillator changes the initial frequency of each chirp signal. A transmitter emits the transmission signal, and a receiver receives a reflected wave of the transmission signal reflected at an object and an unwanted wave as a reception signal. Circuitry is configured to estimate a phase of the reception signal from the transmission signal and the reception signal, calculate a correlation between a change pattern of the initial frequency of each chirp signal and a change pattern of the phase of the reception signal, estimate the reflected wave from the reception signal based on the correlation, and calculate a number of incoming waves based on a result of the estimation of the reflected wave.

20 Claims, 7 Drawing Sheets

(56) References Cited

U.S. PATENT DOCUMENTS

| | | | | |
|---|---|---|---|---|
| 8,446,312 | B2* | 5/2013 | Kanamoto | G01S 13/04 |
| | | | | 342/149 |
| 8,552,907 | B2* | 10/2013 | Kanamoto | G01S 7/295 |
| | | | | 342/149 |
| 10,067,227 | B2* | 9/2018 | Kamo | G01S 13/584 |
| 10,145,936 | B2* | 12/2018 | Kishigami | G01S 7/282 |
| 11,327,172 | B2* | 5/2022 | You | G01S 7/0232 |
| 11,448,725 | B2* | 9/2022 | Iwasa | G01S 13/325 |
| 12,259,458 | B2* | 3/2025 | Yoshizawa | H01Q 21/06 |
| 2006/0007036 | A1* | 1/2006 | Natsume | G01S 3/74 |
| | | | | 342/107 |
| 2010/0019954 | A1* | 1/2010 | Mizutani | H01Q 21/22 |
| | | | | 342/147 |
| 2010/0033365 | A1* | 2/2010 | Kishida | G01S 13/42 |
| | | | | 342/146 |
| 2016/0097853 | A1* | 4/2016 | Kamo | H01Q 1/32 |
| | | | | 342/70 |
| 2016/0223651 | A1* | 8/2016 | Kamo | G01S 13/426 |
| 2017/0307727 | A1* | 10/2017 | Goda | G01S 13/584 |
| 2018/0095173 | A1* | 4/2018 | Kurono | G01S 13/343 |
| 2018/0252797 | A1 | 9/2018 | Frick et al. | |
| 2019/0137616 | A1* | 5/2019 | Kishigami | G01S 13/48 |
| 2019/0293749 | A1* | 9/2019 | Itkin | G01S 13/931 |
| 2019/0391230 | A1* | 12/2019 | Loesch | G01S 13/42 |
| 2020/0124699 | A1* | 4/2020 | Meissner | G01S 13/0209 |
| 2020/0278439 | A1* | 9/2020 | Goto | H01Q 3/2605 |
| 2021/0025969 | A1* | 1/2021 | Ouchi | G01S 13/931 |
| 2021/0199757 | A1* | 7/2021 | Oshima | G01S 3/74 |
| 2021/0333386 | A1* | 10/2021 | Park | G01S 7/356 |
| 2022/0276369 | A1* | 9/2022 | Yoshizawa | H01Q 21/06 |

FOREIGN PATENT DOCUMENTS

| | | |
|---|---|---|
| JP | 2006-153579 A | 6/2006 |
| JP | 2008-203029 A | 9/2008 |
| JP | 2009-109380 A | 5/2009 |
| JP | 2018-129670 A | 8/2018 |
| WO | 2004/077775 A1 | 9/2004 |

OTHER PUBLICATIONS

International Search Report and Written Opinion mailed on May 25, 2021, received for PCT Application PCT/JP2021/014911, filed on Apr. 8, 2021, 10 pages including English Translation.

* cited by examiner

RADAR DEVICE, VEHICLE, AND METHOD OF ESTIMATING NUMBER OF INCOMING WAVES

CROSS-REFERENCE TO RELATED APPLICATIONS

The present application is a continuation of PCT/JP2021/014911, filed Apr. 8, 2021, which claims priority to Japanese patent application JP 2020-074296, filed Apr. 17, 2020, the entire contents of each of which being incorporated herein by reference.

TECHNICAL FIELD

The present disclosure relates to a radar device, a vehicle, and a method of estimating the number of incoming waves.

BACKGROUND ART

Of algorithms for estimating the direction of arrival of a radio wave, many algorithms need information about the number of incoming waves. With a background situation like the above, the patent document 1 proposes a technique that calculates a covariant matrix based on reception signals received with an array antenna, calculates eigen values of the covariance matrix, normalizes the eigen values by dividing the eigen values by one of diagonal components of the covariance matrix, and estimates the number of eigen values in the normalized eigen values that are greater than a threshold value as the number of incoming waves. This estimation technique enables to improve the estimation accuracy of the number of incoming waves even in an external noise environment that is not limited to a white noise environment.

CITATION LIST

Patent Document

Patent Document 1: Japanese Unexamined Patent Application Publication No. 2006-153579

SUMMARY

Technical Problems

However, in the case where the correlation among incoming waves is high (for example, in the case where all the incoming waves are sinusoidal waves of the same frequency), it is known that the technique described in the patent document 1 cannot accurately estimate the number of incoming waves, and thus the technique described in the patent document 1 is unfit for usages such as a radar.

In view of the above, it would be preferable to estimate the number of incoming waves in a radar device more accurately.

Solution to Problem

In order to resolve the foregoing problems, a radar device includes: an oscillator configured to generate a transmission signal including a plurality of chirp signals, the chirp signal having a frequency that is increasing or decreasing from an initial frequency in each predetermined sweep cycle, the oscillator being able to change the initial frequency of each chirp signal; a transmitter that emits the transmission signal; a receiver that receives a reflected wave of the transmission signal reflected at an object and an unwanted wave as a reception signal; and circuitry configured to: estimate a phase of the reception signal from the transmission signal and the reception signal; calculate a correlation between a change pattern of the initial frequency of each chirp signal and a change pattern of the phase of the reception signal; estimate the reflected wave from the reception signal based on the correlation; and calculate a number of incoming waves based on a result of the estimation of the reflected wave.

Advantageous Effects

According to an embodiment, it becomes possible to estimate the number of incoming waves in a radar device more accurately.

DESCRIPTION OF EMBODIMENTS

Figure 1:
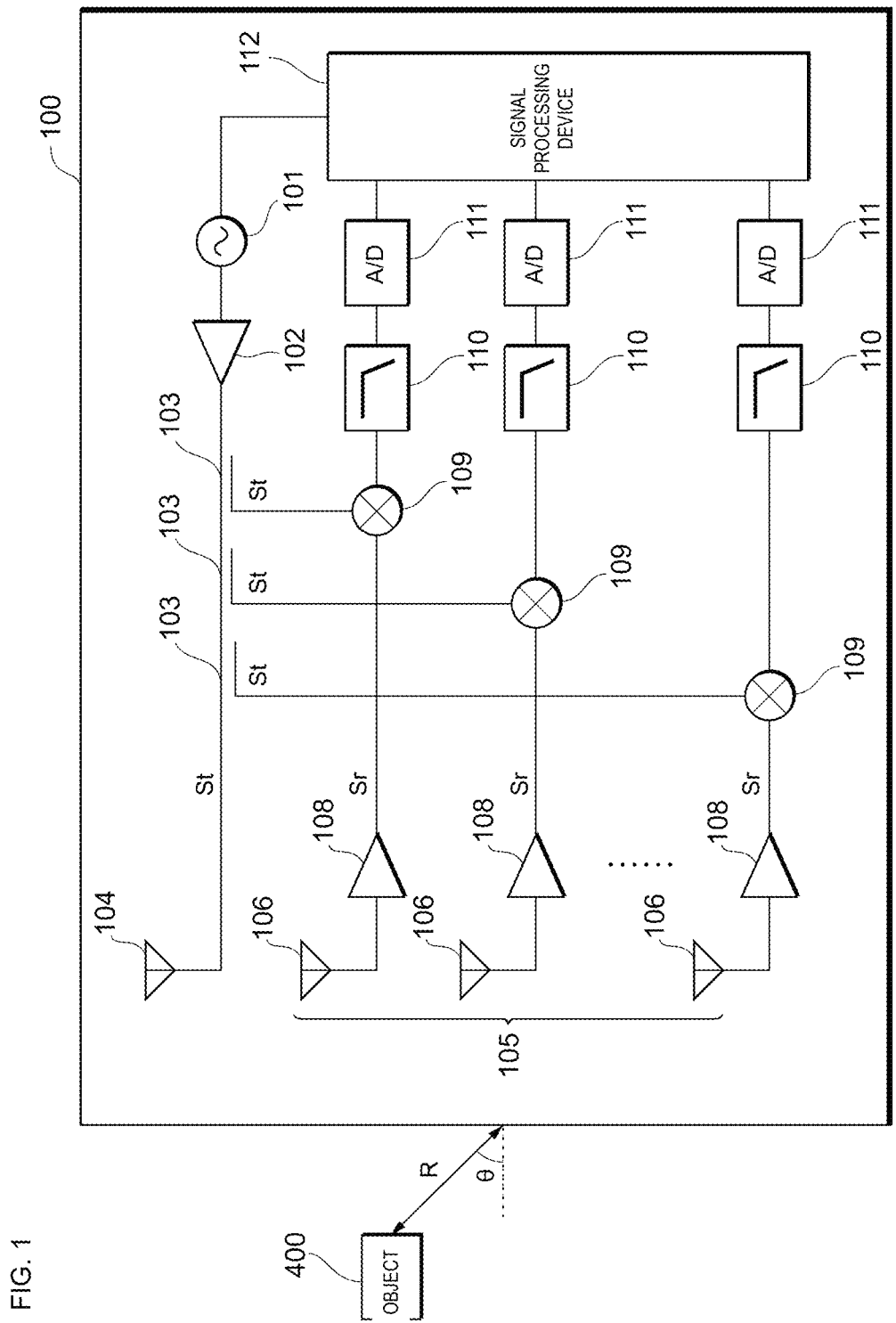
FIG. 1 is an explanatory diagram illustrating an example of configuration of a radar device relating to an embodiment.

Hereinafter, embodiments are described with reference to the drawings. Here, same reference numerals denote the same constituent elements, and overlapping descriptions thereof are omitted. FIG. 1 is an explanatory diagram illustrating an example of a configuration of a radar device 100 relating to an embodiment. The radar device 100 is a frequency modulating continuous wave radar (FM-CW radar) that is one kind of a continuous wave radar employing a frequency modulating system. The radar device 100 measures a relative location of an object 400 relative to the radar device 100 (for example, the object 400's angle θ relative to the radar device 100 and the distance R between the radar device 100 and the object 400). The radar device 100 includes an oscillator 101, an amplifier 102, a plurality of distributors 103, a transmission antenna 104, a reception antenna 105, a plurality of amplifiers 108, a plurality of mixers 109, a plurality of filters 110, a plurality of A/D converters 111, and a signal processing device (e. g., processor, CPU, ASIC, ALU, etc.) 112. As the A/D converter 111, a typical analog-digital converter circuit can be used. As the analog-digital converter circuit, various systems such as, for example, a flash type, a pipeline type, a successive approximation type, a delta sigma type, a double integral type, and the like can be used.

The oscillator 101 is an example of an oscillation circuit that generates and outputs a transmission signal $S_t$ including a plurality of chirp signals. The oscillator 101 is, for example, a voltage controlled oscillator. The amplifier 102 amplifies the transmission signal $S_t$ output from the oscillator 101. Each distributor 103 distributes the transmission signal $S_t$ output from the amplifier 102 to the transmission antenna 104 and the mixer 109. The transmission signal $S_t$ from the amplifier 102, which is to be distributed to the mixer 109, is also referred to as a local signal. The transmission antenna 104 is an example of a transmitter that emits the transmission signal $S_t$ as a radar wave.

The reception antenna 105 is a linear array antenna in which a plurality of antenna elements 106 are arranged at equal intervals. The reception antenna 105 is an example of a receiver that receives, as a reception signal $S_r$, a reflected wave of the transmission signal $S_t$ reflected at the object 400 and an unwanted wave. The unwanted wave means an interference wave other than the reflected wave of the transmission signal $S_t$ reflected at the object 400 (for example, a radar wave emitted from another radar device) or noise (for example, white noise). Each amplifier 108 amplifies the reception signal $S_r$ output from the antenna element 106. Each mixer 109 generates and outputs a beat signal BT by mixing the reception signal $S_r$ output from the amplifier 108 and the transmission signal $S_t$ distributed from the distributor 103. The beat signal BT is an intermediate frequency signal indicating the frequency difference between the transmission signal $S_t$ and the reception signal S. Each filter 110 is a low pass filter that removes an unwanted signal component of the beat signal BT output from the mixer 109. Each A/D converter 111 performs an A/D-conversion on the beat signal BT output from each filter 110.

The signal processing device 112 calculates the relative location of the object 400 relative to the radar device 100 by performing signal processing on the beat signal BT that has been converted to a digital signal by each A/D converter 111. The signal processing device 112 controls the generation of the transmission signal $S_t$ by the oscillator 101. The signal processing device 112 can be a microcomputer including a memory device that stores a signal processing program for implementing signal processing based on the beat signal BT, control of the oscillator 101, and the like and a processor that runs the signal processing program. The signal processing device 112 can be configured to implement the signal processing of FIG. 8, which will be described later, by causing the processor to parse and run the signal processing program (for example, an initial frequency setting carried out in Step 801, a phase estimation carried out in Step 806, a correlation calculation carried out in Step 808, a reflected wave estimation carried out in Step 809, a number-of-incoming-waves estimation carried out in Step 810, and a direction-of-arrival estimation carried out in Step 811).

Note that, in this embodiment, the numbers of the distributors 103, the amplifiers 108, the mixers 109, the filters 110, and the A/D converters 111 are all equal to the number of the antenna elements 106.

Figure 2:
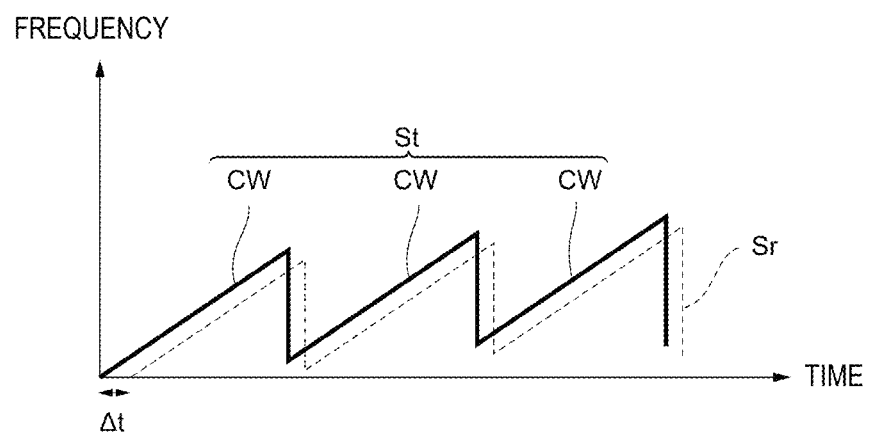
FIG. 2 is an explanatory diagram illustrating examples of a transmission signal and a reception signal relating to the embodiment.

FIG. 2 is an explanatory diagram illustrating examples of the transmission signal $S_t$ and the reception signal $S_r$. The transmission signal $S_t$ includes a plurality of chirp signals CW. The frequency of the chirp signal CW changes (increases or decreases) as time passes. In FIG. 2, the chirp signal CW is illustrated as an up chirp whose frequency increases as time passes. However, the chirp signal CW may also be a down chirp whose frequency decreases as time passes. The reception signal $S_r$ is delayed by time $\Delta t$ compared with the transmission signal $S_t$. Assuming c is the velocity of a radio wave and R is the distance between the radar device 100 and the object 400, the formula (1) holds.

$$\Delta t = 2R/c. \quad (1)$$

Figure 3:
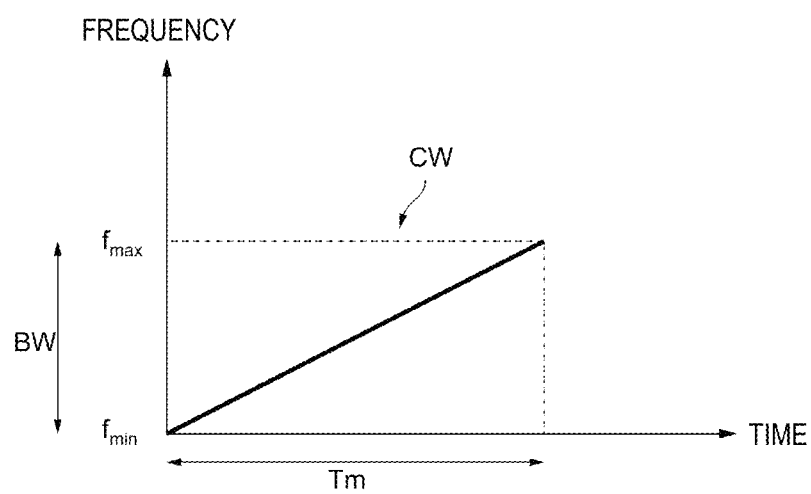
FIG. 3 is an explanatory diagram illustrating an example of a chirp signal relating to the embodiment.

FIG. 3 is an explanatory diagram illustrating an example of the chirp signal CW. In FIG. 3, the chirp signal CW is illustrated as a linear chirp whose frequency increases linearly as time passes. Assuming $T_m$ is a sweep cycle of the chirp signal CW, $f_{min}$ is an initial frequency that is an initial value (minimum value) of the frequency of the chirp signal CW, $f_{max}$ is the maximum value of the frequency of the chirp signal CW, and BW is a band width ($f_{max}-f_{min}$) of the chirp signal CW, an instantaneous frequency $f_{tx}$ of the chirp signal CW is given by the formula (2).

$$f_{tx} = (BW/T_m)t + f_{min} \quad (2)$$

Assuming $A_{tx}$ is an amplitude of the transmission signal $S_t$, $\Omega_{tx}$ is an angular frequency ($2\pi f_{tx}$) of the transmission signal $S_t$, $\phi_1$ is an initial phase of the transmission signal $S_t$, and t is time, the transmission signal $S_t$ is given by the formula (3).

$$S_t = A_{tx} \cos(\Phi_{tx} t + \phi_1) \quad (3)$$

Assuming $A_{rx}$ is an amplitude of the reception signal $S_r$ that is a reflected wave of the transmission signal $S_t$ reflected at the object 400, $\Omega_{rx}$ is an angular frequency ($2\pi f_{rx}$) of the reception signal $S_r$, $\phi_1$ is an initial phase of the reception signal $S_r$, and t is time, the reception signal $S_r$ is given by the formula (4).

$$S_r = A_{rx} \cos\{\Omega_{rx}(t-\Delta t) + \phi 1\} \quad (4)$$

The beat signal BT is given by the formula (5) and the formula (6).

$$BT = 0.5(A_{tx} A_{rx})\cos 2\pi(kt + 2Rf_{min}/c) \quad (5)$$

$$k = 2RBW/cT_m \quad (6)$$

Assuming $f_{peak}$ is the frequency at which the amplitude of the beat signal BT that has been subjected to a Fourier conversion reaches the maximum, the formula (7) holds.

$$R = cT_m f_{peak}/2BW \quad (7)$$

The signal processing device 112 obtains $f_{peak}$ by performing a Fourier conversion on the beat signal BT and calculates the distance R between the radar device 100 and the object 400 using the formula (7). Further, the signal processing device 112 estimates the direction of arrival of the reception signal $S_r$ by, for example, performing signal analysis of the beat signal BT using an AF (Annihilating Filter) method. The AF method is an algorithm that estimates the direction of arrival of the reception signal $S_r$ by utilizing a phase difference caused by a path difference of the reception signal $S_r$ received by each antenna element 106. The direction of arrival of the reception signal $S_r$ coincides with the object 400's angle $\theta$ relative to the radar device 100.

Figure 4:
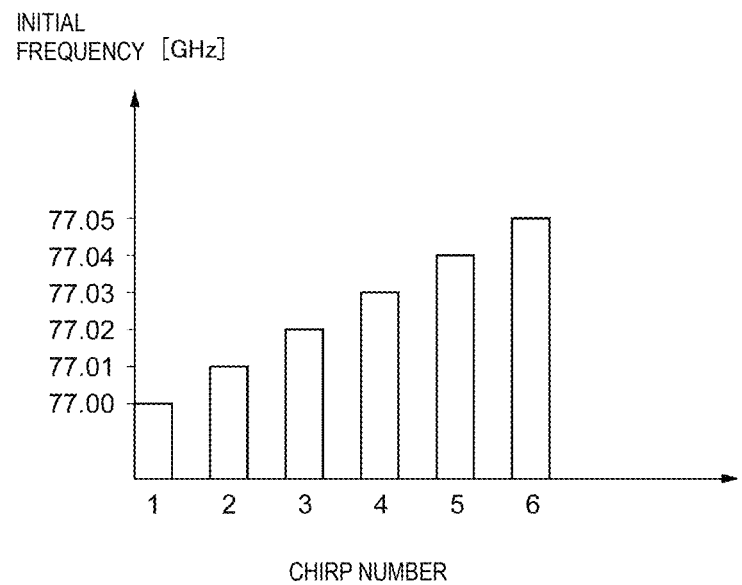
FIG. 4 is an explanatory diagram illustrating an example of a change pattern of an initial frequency of the chirp signal relating to the embodiment.

FIG. 4 is an explanatory diagram illustrating an example of a change pattern of the initial frequency $f_{min}$ of the chirp signal CW. In FIG. 4, the horizontal axis indicates the chirp number, and the vertical axis indicates the initial frequency $f_{min}$ of each chirp signal CW. The chirp number is a number for distinguishing each chirp signal CW, and in this example, the chirp number of a certain chirp signal CW coincides with the order of emission of that chirp signal CW. In the example illustrated in FIG. 4, the initial frequency Emin of the chirp signal CW having the chirp number N is {77.00+(N−1)×0, 01} GHz. Note that N is an integer whose value is one of 1 to 6.

When the initial frequency $f_{min}$ of each chirp signal CW is changed in a stepwise fashion, the phase of the beat signal BT indicating the frequency difference between the transmission signal $S_t$ and the reception signal $S_r$, which is a reflected wave of the transmission signal $S_t$ reflected at the object 400, similarly changes in a stepwise fashion. There is a correlation between the change pattern of the initial frequency $f_{min}$ of each chirp signal CW and the change pattern of the phase of the beat signal BT. For example, when the initial frequency $f_{min}$ of the chirp signal CW is increased, the phase of the beat signal BT increases (rotates in the positive direction) according to the formula (5). When the initial frequency $f_{min}$ of the chirp signal CW is decreased, the phase of the beat signal BT decreases (rotates in the negative direction) according to the formula (5).

On the other hand, even when the initial frequency $f_{min}$ of each chirp signal CW is changed in a stepwise fashion, the phase of the beat signal BT indicating the frequency difference between the transmission signal $S_t$ and the reception signal $S_r$, which is an unwanted wave, does not exhibit any change correlating with the change pattern of the initial frequency $f_{min}$.

Figure 5:
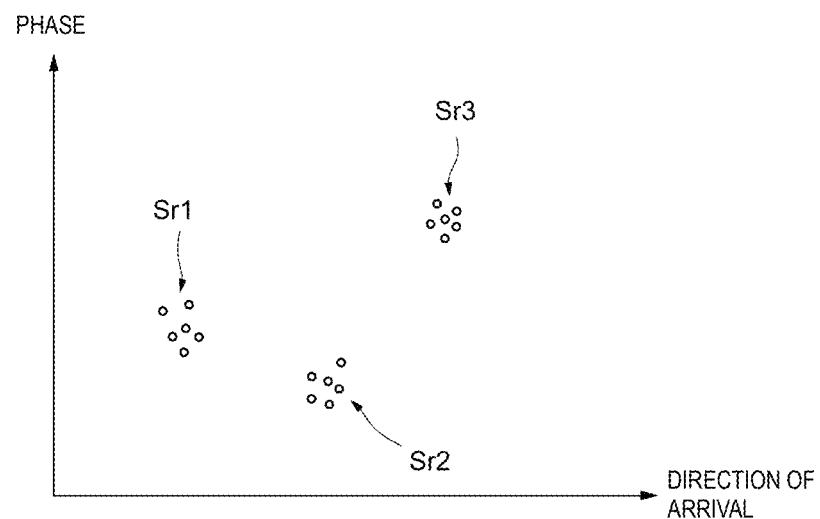
FIG. 5 is an explanatory diagram illustrating a relationship between a change pattern of phase of the reception signal and a change pattern of the initial frequency of each chirp signal relating to the embodiment.
Figure 6:
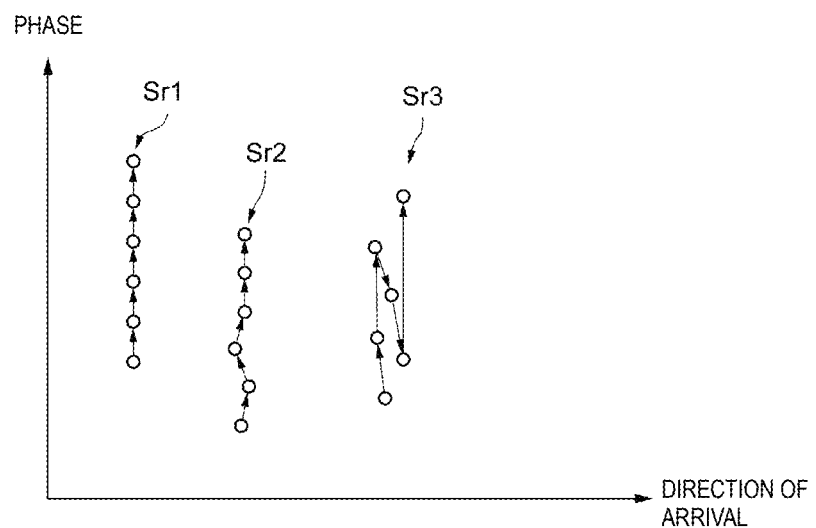
FIG. 6 is an explanatory diagram illustrating a relationship between a change pattern of phase of the reception signal and a change pattern of the initial frequency of each chirp signal relating to the embodiment.

FIG. 5 and FIG. 6 are explanatory diagrams each illustrating correlations between the change pattern of the initial frequency $f_{min}$ of each chirp signal CW and the change pattern of the phases of the reception signals $S_{r1}$, $S_{r2}$, and $S_{r3}$. The reception signals Sm and Sm are each, for example, a reception signal that is a reflected wave of the transmission signal $S_t$ reflected at the object 400. The reception signal $S_{r3}$ is, for example, a reception signal (false response signal) artificially generated as a result of signal processing of the beat signal BT by the signal processing device 112 due to white noise. Alternatively, the reception signal $S_{r3}$ may be, for example, a reception signal that is an interference wave (for example, a radar wave from another radar device). Here, in FIG. 5 and FIG. 6, the horizontal axis indicates the direction of arrival of each reception signal, and the vertical axis indicates the phase of each reception signal.

In the case where the initial frequency $f_{min}$ of each chirp signal CW is set to the same frequency, no phase change occurs in any of the reception signals $S_{r1}$, $S_{r2}$, and $S_{r3}$ as illustrated in FIG. 5. In contrast, in the case where the initial frequency $f_{min}$ of each chirp signal CW is changed, the phases of the reception signals $S_{r1}$ and $S_{r2}$ exhibit the changes correlating with the change pattern of the initial frequency $f_{min}$. While the phase of the reception signal $S_{r3}$ does not exhibit any change correlating with the change pattern of the initial frequency $f_{min}$, as illustrated in FIG. 6.

Figure 7:
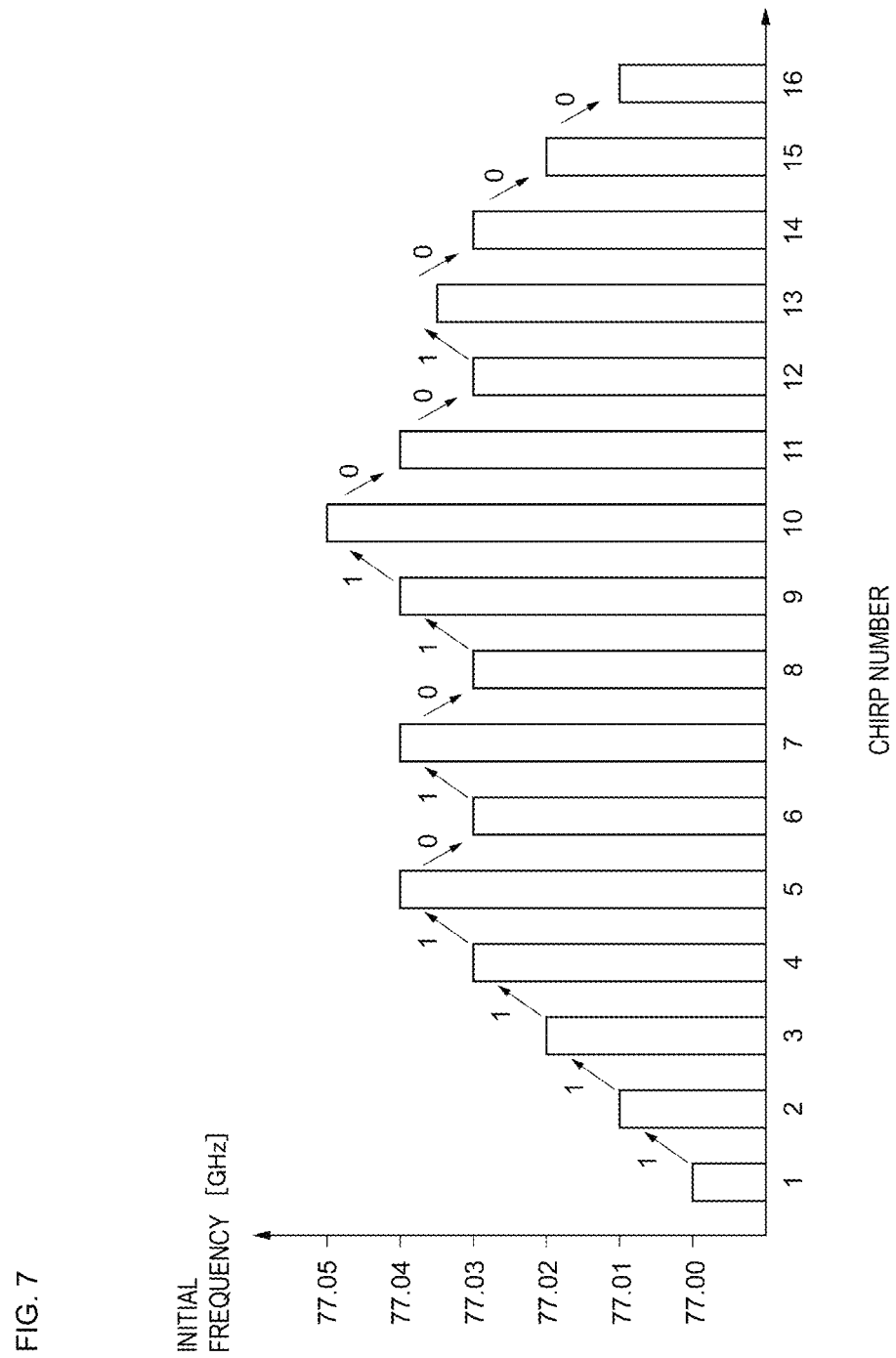
FIG. 7 is an explanatory diagram illustrating an example of a change pattern of the initial frequency of the chirp signal relating to an embodiment.

As a result of the above, it becomes possible to calculate the correlation between the change pattern of the initial frequency $f_{min}$ of each chirp signal CW and the change pattern of the phase of the reception signal $S_r$, and based on the calculated correlation, from the reception signal $S_r$, estimate a reception signal that is a reflected wave of the transmission signal $S_t$ reflected at the object 400. The change pattern of the initial frequency $f_{min}$ of each chirp signal CW is, for example, not limited to the pattern in which the initial frequency Imin of each chirp signal CW continues to increase in a stepwise fashion as illustrated in FIG. 4 but may alternatively be, for example, a pattern in which the initial frequency $f_{min}$ of each chirp signal CW increases and decreases in a stepwise fashion, as illustrated in FIG. 7.

By setting the initial frequency $f_{min}$ of each chirp signal CW in such a manner as to alternate an increase and a decrease of the initial frequency $f_{min}$ of each chirp signal CW, it becomes possible to generate more chirp signals CW within a limited band width BW. From the reception signal $S_r$ including an unwanted wave, this enables a highly accurate estimation of the reception signal that is a reflected wave of the transmission signal $S_t$ reflected at the object 400. For example, the change pattern of the initial frequency of each chirp signal CW may be set in such a manner as to follow a pseudorandom number sequence of a first logic value (for example, "1") and a second logic value (for example, "Q"). Here, the first logic value represents a change pattern in which, of two consecutive chirp signals CW, the initial frequency $f_{min}$ of the following chirp signal CW is higher than the initial frequency $f_{min}$ of the preceding chirp signal CW. The second logic value represents a change pattern in which, of two consecutive chirp signals CW, the initial frequency $f_{min}$ of the preceding chirp signal CW is higher than the initial frequency $f_{min}$ of the following chirp signal CW. For example, the change pattern of the initial frequency $f_{min}$ of each chirp signal CW illustrated in FIG. 7 may be set in such a manner as to follow a 15-bit M-sequence (maximum length sequence). By setting the change pattern of the initial frequency $f_{min}$ of each chirp signal CW in such a manner as to follow a pseudorandom number sequence, it becomes possible to detect whether a signal received as the reception signal $S_r$ is a radar wave from another radar device (unwanted wave) or not.

Note that by encoding the change pattern of the phase of the reception signal $S_r$ in binary form with setting in which "1" denotes an increase in the phase of the reception signal $S_r$ and "O" denotes a decrease in the phase of the reception signal $S_r$, it becomes possible to calculate the correlation between the change pattern of the initial frequency $f_{min}$ of each chirp signal CW and the change pattern of the phase of the reception signal $S_r$.

Figure 8:
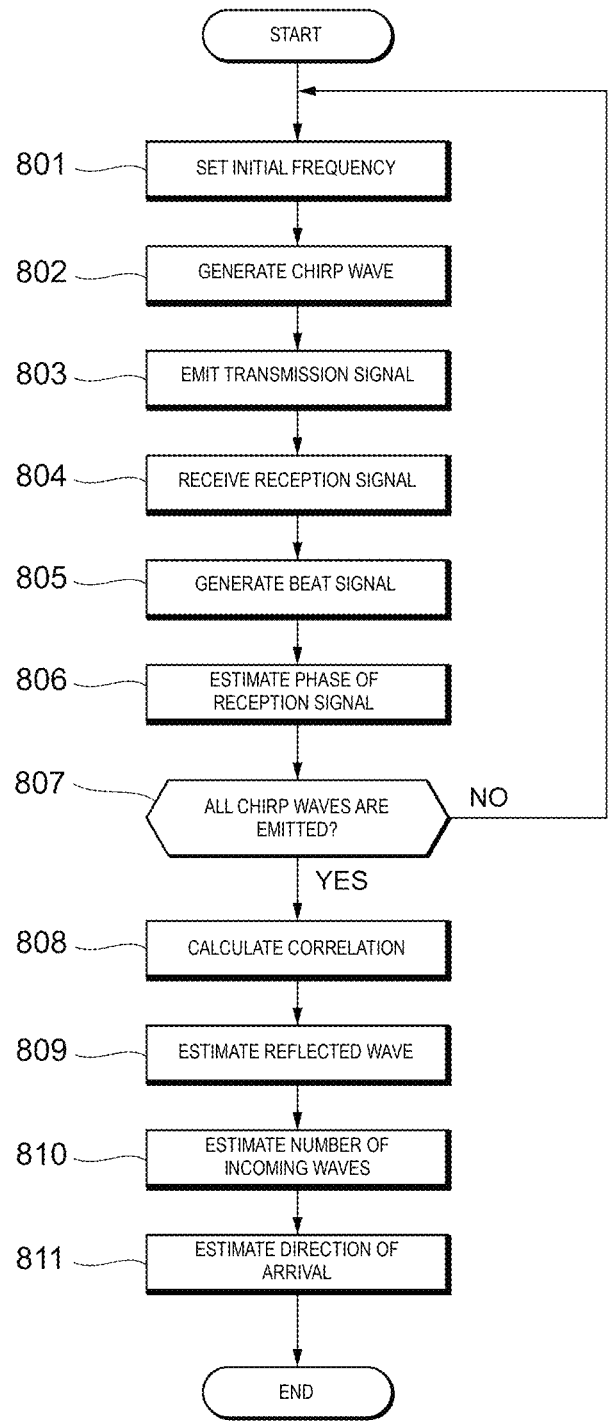
FIG. 8 is a flowchart illustrating a flow of signal processing relating to the embodiment.

FIG. 8 is a flowchart illustrating a flow of signal processing relating to the embodiment. The signal processing device 112 sets the initial frequency $f_{min}$ of each chirp signal CW in such a way that the initial frequencies $f_{min}$ of two time-consecutive chirp signals CW differ from each other (step 801). Based on the value of the initial frequency $f_{min}$ set in the step 801, the oscillator 101 generates and outputs each chirp signal CW (step 802). The transmission antenna 104 emits a transmission signal $S_t$ including a plurality of chirp signals CW, which are generated and output in the step 802, as a radar wave (step 803). The reception antenna 105 receives, as a reception signal $S_r$, a reflected wave of the transmission signal $S_t$ reflected at the object 400 and an unwanted wave (step 804). The mixer 109 generates and outputs a beat signal BT by mixing the reception signal $S_r$ and the transmission signal $S_t$ (step 805). The signal processing device 112 estimates the phase of the reception signal $S_r$ by performing signal analysis of the beat signal BT using an AF method (step 806). The signal processing device 112 determines whether emission of all the chirp signals CW is completed or not (step 807). The signal processing device 112 calculates the correlation between the change pattern of the initial frequency $f_{min}$ of each chirp signal CW and the change pattern of the phases of the reception signal $S_r$ (step 808). Based on the correlation calculated in the step 808, from the reception signal $S_r$, the signal processing device 112 estimates a reception signal that is a reflected wave of the transmission signal $S_t$ reflected at the object 400 (step 809). Based on a result of the estimation of the reflected wave in the step 809, the signal processing device 112 calculates the number of incoming waves (step 810). Based on the number of incoming waves calculated in the step 810, the signal processing device 112 estimates the direction of arrival of the reception signal $S_r$ that is the reflected wave of the transmission signal $S_t$ reflected at the object 400 (step 811).

According to the embodiment, it becomes possible to estimate the number of incoming waves more accurately by estimating, from the reception signal $S_r$, the reflected wave of the transmission signal $S_t$ reflected at the object 400 based on the correlation between the change pattern of the initial frequency $f_{min}$ of each chirp signal CW and the change pattern of the phase of the reception signal $S_r$. Further, by using the number of incoming waves estimated with a high degree of accuracy, it becomes possible to estimate the direction of arrival of the reception signal $S_r$ that is a reflected wave of the transmission signal $S_t$ reflected at the object 400 more accurately.

Note that the algorithm for estimating the direction of arrival of the reception signal $S_r$ is not limited to the AF method, and algorithms such as, for example, a known maximum likelihood estimation method and the like may also be used.

Figure 9:
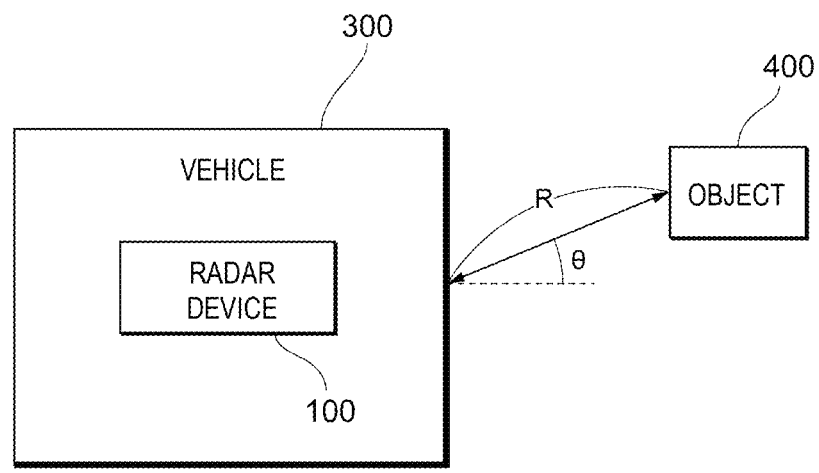
FIG. 9 is an explanatory diagram illustrating an example of a vehicle relating to an embodiment.

FIG. 9 is an explanatory diagram illustrating an example of a vehicle 300 relating to an embodiment. The vehicle 300 includes the radar device 100. The radar device 100 measures a relative location of the object 400 relative to the vehicle 300 (for example, the object 400's angle θ relative to the vehicle 300 and the distance R between the vehicle 300 and the object 400). The object 400 may be, for example, an object (for example, a guard rail) located around the vehicle 300 or another vehicle preceding or following the vehicle 300. The radar device 100 may control driving of the vehicle 300 and the like based on information indicating the relative location of the object 400 relative to the vehicle 300.

Note that the embodiments described above are provided to facilitate understanding of the present disclosure and is not to be construed as limiting the present disclosure. The present disclosure can be modified or improved without departing from its spirit, and the present disclosure also includes equivalents thereof. That is to say, ones obtained by suitably modifying designs of the embodiments by those skilled in the art are also included within the scope of the present disclosure as long as they include features of the present disclosure. Further, constituent elements included in the embodiments may be combined as long as technically feasible, and ones obtained by combining those are also included within the scope of the present disclosure as long as they include the features of the present disclosure.

REFERENCE SIGNS LIST

100 Radar device
101 Oscillator
102 Amplifier
103 Distributor
104 Transmission antenna
105 Reception antenna
106 Antenna element
108 Amplifier
109 Mixer
110 Filter
111 A/D converter
112 Signal processing device
300 Vehicle
400 Object

The invention claimed is:

1. A radar device comprising:
an oscillator configured to generate a transmission signal including a plurality of chirp signals, the chirp signal having a frequency that is increasing or decreasing from an initial frequency in each predetermined sweep cycle, the oscillator being able to change the initial frequency of each chirp signal;
a transmitter configured to emit the transmission signal;
a receiver configured to receive a reflected wave of the transmission signal reflected at an object and an unwanted wave as a reception signal; and
circuitry configured to:
estimate a phase of the reception signal from the transmission signal and the reception signal;
calculate a correlation between a change pattern of the initial frequency of each chirp signal and a change pattern of the phase of the reception signal;
estimate the reflected wave from the reception signal based on the correlation; and
calculate a number of incoming waves based on a result of the estimation of the reflected wave.

2. The radar device according to claim 1, wherein
the change pattern of the initial frequency of each chirp signal follows a pseudorandom number sequence of a first logic value and a second logic value,
the first logic value represents a change pattern in which, of two consecutive chirp signals in the plurality of chirp signals, the initial frequency of a following chirp signal is higher than the initial frequency of a preceding chirp signal, and
the second logic value represents a change pattern in which, of two consecutive chirp signals in the plurality of chirp signals, the initial frequency of a following chirp signal is lower than the initial frequency of a preceding chirp signal.

3. The radar device according to claim 1, wherein the circuitry is further configured to estimate a direction of arrival of the reflected wave based on the estimated number of incoming waves.

4. A vehicle comprising the radar device according to claim 1.

5. The radar device according to claim 2, wherein the circuitry is further configured to estimate a direction of arrival of the reflected wave based on the estimated number of incoming waves.

6. A vehicle comprising the radar device according to claim 2.

7. The radar device according to claim 1, wherein the oscillator is further configured to set the initial frequency of each chirp signal in such a manner as to alternate an increase and a decrease of the initial frequency of each chirp signal.

8. The radar device according to claim 3, wherein the oscillator is further configured to set the initial frequency of each chirp signal in such a manner as to alternate an increase and a decrease of the initial frequency of each chirp signal.

9. The radar device according to claim 4, wherein the oscillator is further configured to set the initial frequency of each chirp signal in such a manner as to alternate an increase and a decrease of the initial frequency of each chirp signal.

10. The radar device according to claim 1, wherein the oscillator is further configured to change the initial frequency of each chirp signal in a stepwise fashion.

11. A method of estimating a number of incoming waves, comprising:
generating a transmission signal including a plurality of chirp signals, the chirp signal having a frequency that is increasing or decreasing from an initial frequency in each predetermined sweep cycle, the step enabling to change the initial frequency of each chirp signal, emitting the transmission signal;

receiving a reflected wave of the transmission signal reflected at an object and an unwanted wave as a reception signal;

estimating a phase of the reception signal from the transmission signal and the reception signal;

calculating a correlation between a change pattern of the initial frequency of each chirp signal and a change pattern of the phase of the reception signal;

estimating the reflected wave from the reception signal based on the correlation; and calculating a number of incoming waves based on a result of the estimation of the reflected wave.

12. The method according to claim 11, wherein the change pattern of the initial frequency of each chirp signal follows a pseudorandom number sequence of a first logic value and a second logic value, the first logic value represents a change pattern in which, of two consecutive chirp signals in the plurality of chirp signals, the initial frequency of a following chirp signal is higher than the initial frequency of a preceding chirp signal, and the second logic value represents a change pattern in which, of two consecutive chirp signals in the plurality of chirp signals, the initial frequency of a following chirp signal is lower than the initial frequency of a preceding chirp signal.

13. The method according to claim 11, further comprising estimating a direction of arrival of the reflected wave based on the estimated number of incoming waves.

14. The method according to claim 12, further comprising estimating a direction of arrival of the reflected wave based on the estimated number of incoming waves.

15. The method according to claim 11, further comprising setting the initial frequency of each chirp signal in such a manner as to alternate an increase and a decrease of the initial frequency of each chirp signal.

16. The method according to claim 13, further comprising setting the initial frequency of each chirp signal in such a manner as to alternate an increase and a decrease of the initial frequency of each chirp signal.

17. The method according to claim 11, further comprising changing the initial frequency of each chirp signal in a stepwise fashion.

18. The method according to claim 13, further comprising changing the initial frequency of each chirp signal in a stepwise fashion.

19. The method according to claim 11, further comprising mixing the reception signal and the transmission signal to generate and output a beat signal, wherein the phase of the reception signal is estimated from the beat signal.

20. The method according to claim 11, further comprising mixing the reception signal and the transmission signal to generate and output a beat signal, wherein the phase of the reception signal is estimated from the beat signal.

\* \* \* \* \*